United States Patent
Osadchyy et al.

(10) Patent No.: US 9,692,942 B2
(45) Date of Patent: Jun. 27, 2017

(54) HARD-COPY SIGNATURES USING A CLOUD-CONNECTED PRINTING DEVICE WITH A WORKFLOW SERVICE

(71) Applicant: KYOCERA Document Solutions Inc., Osaka (JP)

(72) Inventors: Oleksandr Osadchyy, Concord, CA (US); Oleg Y. Zakharov, Concord, CA (US)

(73) Assignee: KYOCERA Document Solutions Inc. (JP)

( * ) Notice: Subject to any disclaimer, the term of this patent is extended or adjusted under 35 U.S.C. 154(b) by 0 days.

(21) Appl. No.: 14/634,582

(22) Filed: Feb. 27, 2015

(65) Prior Publication Data

US 2016/0255242 A1    Sep. 1, 2016

(51) Int. Cl.
*G06F 15/00* (2006.01)
*H04N 1/44* (2006.01)
*H04N 1/00* (2006.01)

(52) U.S. Cl.
CPC .......... *H04N 1/444* (2013.01); *H04N 1/00122* (2013.01); *H04N 1/00241* (2013.01); *H04N 2201/0094* (2013.01)

(58) Field of Classification Search
CPC ........... H04N 1/00122; H04N 1/00241; H04N 2201/0094
USPC ............................................... 358/1.13–1.18
See application file for complete search history.

(56) References Cited

U.S. PATENT DOCUMENTS

| 8,810,825 B2 | 8/2014 | Watanabe | |
|---|---|---|---|
| 2013/0083337 A1* | 4/2013 | Tecu | G06F 3/1204 358/1.13 |
| 2014/0071492 A1* | 3/2014 | O'Neill | G06F 3/1204 358/1.15 |

* cited by examiner

*Primary Examiner* — Saeid Ebrahimi Dehkord
(74) *Attorney, Agent, or Firm* — McDonnell Boehnen Hulbert & Berghoff LLP

(57) ABSTRACT

Example systems and related methods may relate to a way to efficiently incorporate authentication to cloud-based review and approval processes. In an example embodiment, a workflow service operating on a network may send a request for document approval to a mobile computing device. The request may correspond to a document. The mobile computing device may be configured to display a graphical identifier that relates to the document for review. The graphical identifier may be scanned via a multi-function printer (MFP) device, which may send an authentication query to the workflow service. The workflow service may determine an authenticated user based on the authentication query and provide a printable version of the document. The MFP may thereafter print the document for a user's signature. After signature, the signed document may be scanned in at the MFP and uploaded to the workflow service.

22 Claims, 4 Drawing Sheets

HARD-COPY SIGNATURES USING A CLOUD-CONNECTED PRINTING DEVICE WITH A WORKFLOW SERVICE

BACKGROUND

Cloud-based review and approval methods include various functions such as: mobile printing/scanning, cloud-based storage, and user authentication. However, a need exists for more integrated and efficient methods and systems to accomplish such review and approval tasks.

SUMMARY

In a first aspect, a multi-function printer device (MFP) is provided. The MFP preferably includes a scanning unit, a printing unit, a display unit, a workflow service client, and a processor. The display unit is configured to display a graphical user interface and the workflow service client is communicatively coupled to a workflow service operating on a network. The processor is configured to execute instructions. The instructions include causing the scanning unit to scan a graphical identifier displayed on a display screen of a mobile computing device. The graphical identifier is indicative of a document. The instructions also include causing the workflow service client to send an authentication query. The authentication query includes information based on the graphical identifier. The instructions include receiving, via the workflow service client, an acknowledgment.

In a second aspect, a method is provided. The method preferably includes receiving, at a mobile computing device, a request for document approval. The request for document approval corresponds to a document, and the mobile computing device is communicatively coupled to a workflow service operating on a network. The method includes causing a display screen of the mobile computing device to display a graphical identifier indicative of the document. The method also includes causing a scanning unit of a multi-function printer (MFP) device to scan the graphical identifier. The MFP includes a workflow service client communicatively coupled to the workflow service. The method further includes causing the workflow service client to send an authentication query. The authentication query includes information based on the graphical identifier and authentication information indicative of the mobile computing device. The method yet further includes receiving, via the workflow service client, an acknowledgement.

In a third aspect, a system is provided. The system preferably includes a workflow service operating on a network. The system also includes a mobile computing device. The mobile computing device includes a display screen and is communicatively coupled to the workflow service. The mobile computing device is configured to receive a request for document approval. The request for document approval corresponds to a document. The mobile computing device is additionally configured to display a graphical identifier indicative of the document. The system further includes a multi-function printer (MFP) device. The MFP includes a scanning unit, a printing unit, a display unit, a workflow service client, and a processor. The display unit is configured to display a graphical user interface. The workflow service client is communicatively coupled to the workflow service and the processor is configured to execute instructions. The instructions include causing the scanning unit to scan the graphical identifier displayed on the display screen of the mobile computing device and causing the workflow service client to send an authentication query. The authentication query includes information based on the graphical identifier and authentication information indicative of the mobile computing device. The instructions further include receiving, via the workflow service client, an acknowledgment.

Other aspects, embodiments, and implementations will become apparent to those of ordinary skill in the art by reading the following detailed description, with reference where appropriate to the accompanying drawings.

DETAILED DESCRIPTION

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

The present disclosure may relate to methods and systems that provide an integrated solution to document review and approval tasks. For instance, an example embodiment may include the simple steps of scanning a graphical identifier on a screen of a mobile computing device using a multi-function printing device (MFP), signing a printed document referenced by the graphical identifier, and scanning the signed document at the MFP.

As disclosed herein, such embodiments may provide advantages over conventional review and approval methods, which offer separate functions of authentication, location, cloud print and cloud scan where the user may be expected to use some generic methods and tools to download, upload and modify documents. Specifically, current methods and systems require the user to be experienced in the specific methods and tools, and to understand networks and various electronic document formats.

The methods and systems disclosed herein provide a way to integrate multiple functions of the review and approval process via commonly understandable operations that may include: scanning a screen of a mobile computing device, signing a printed document, and scanning the signed, printed document using the MFP. Furthermore, the disclosed methods and systems may simplify the communication between an end-user and a printing device by eliminating manual information entry at MFP. In an example embodiment, a graphical identifier may serve multiple functions of authentication, document and revision tracking, user identification, location identification, etc. Such methods and systems may provide an easier way to exchange information in the review and approval process.

II. System Examples

Figure 1:
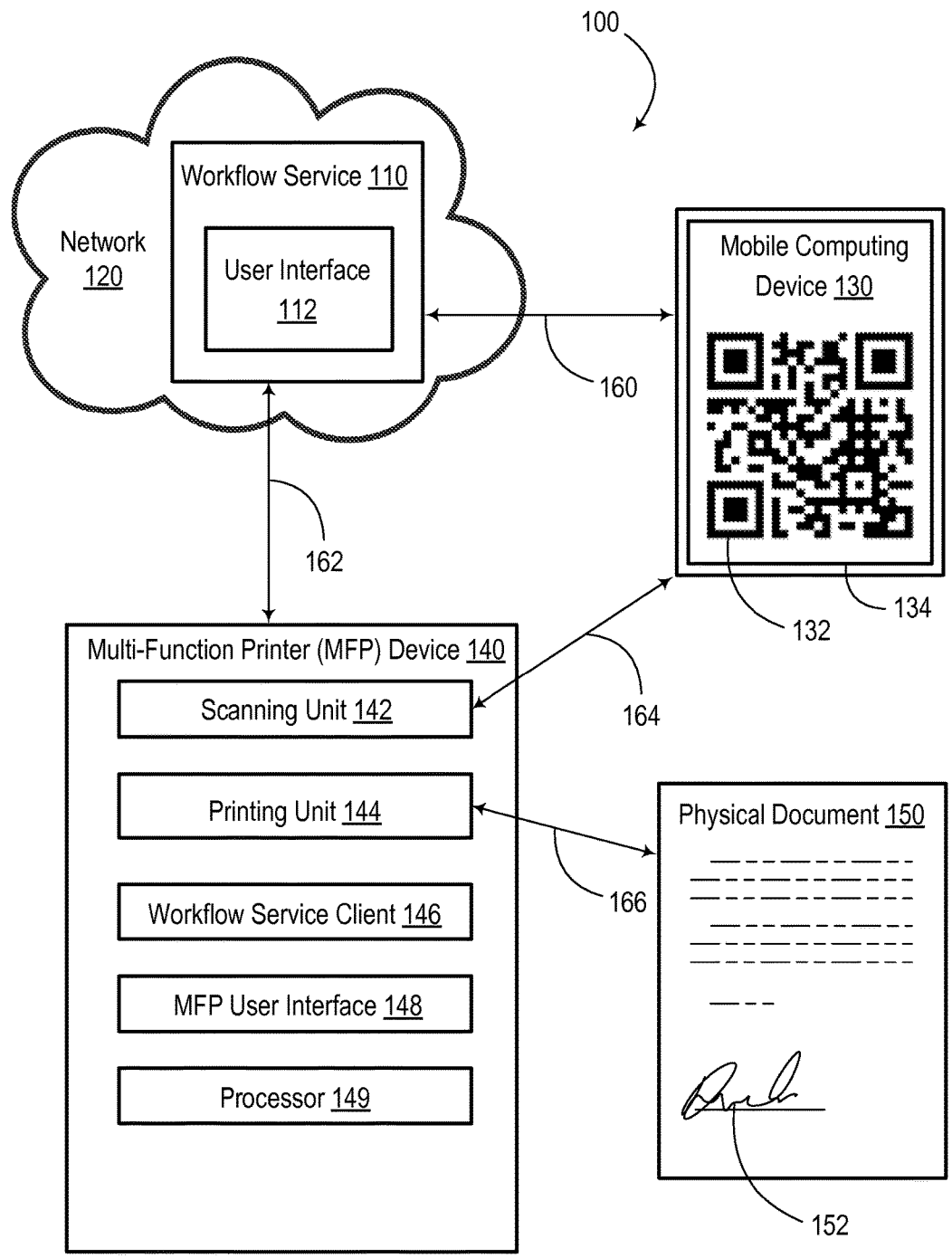
FIG. 1 is a schematic diagram illustrating a system, according to an example embodiment.

FIG. 1 is a schematic diagram illustrating a system 100, according to an example embodiment. The system 100 may include a workflow service 110 operating on a network 120. The workflow service 110 may include a user interface 112. The system 100 also may include a mobile computing device 130. The mobile computing device 130 may include a display screen 134. The mobile computing device is configured to receive a request for document approval.

The request for document approval corresponds to a document stored at the workflow service 110 and may include at least one of an e-mail, a text message, a code, an image, a video, a webpage, or a universal resource locator (URL). The request for document approval may also include, or may provide access to, a graphical identifier 132, which may, in turn, be indicative of the document. The mobile computing device 130 is configured to display the graphical identifier 132 on display screen 134. The mobile computing device 130 is communicatively coupled to the workflow service 110 via communication link 160.

The graphical identifier 132 may include, but is not limited to: a quick-reference (QR) code, a two-dimensional graphical identifier, a one-dimensional barcode, a matrix barcode, or a machine-readable optical label.

The system 100 also may include a multi-function printer (MFP) device 140. The MFP 140 may include a scanning unit 142, a printing unit 144, a workflow service client 146, and an MFP user interface 148. The MFP 140 and/or its components may be communicatively coupled to the mobile computing device 130 and the workflow service 110 via communication link 164 and communication link 162, respectively.

The MFP 140 also may include a processor 149 configured to execute instructions. The MFP instructions may include causing the scanning unit 142 to scan the graphical identifier 132 displayed on the display screen 134 of the mobile computing device 130. The instructions may further include causing the workflow service client 146 to send an authentication query via communication link 162. The authentication query may include information based on the graphical identifier 132 and authentication information indicative of the mobile computing device 130. Additionally or alternatively, the authentication query may include information corresponding to the document. For example, the authentication query may include information such as metadata, a filename, a timestamp, a version number, or an identifier associated with the document.

The MFP instructions may also include receiving, via the workflow service client 146, an acknowledgment. The acknowledgment may include a printable version of the document. The printable version of the document may include a Portable Document Format (PDF), a PostScript (.PS) file, an Encapsulated PostScript (.EPS) file, a .PRN file, or another type of printable document format.

In response to receiving the acknowledgement, the MFP instructions may include causing the printing unit 144 to print a physical document 150 based on the printable version of the document. The physical document 150 may be printed on paper or another physical substrate.

In some embodiments, a signed physical document may include a signature 152. It will be understood that signature 152 may be a physical signature, a physical writing, an electronic signature, or another type of electronic marking, notation, or symbol.

In an example embodiment, the MFP instructions may include causing the scanning unit 142 to scan the signed document. The signed document may include a signed version of the physical document 150. After scanning the signed document, the workflow service client 146 may send the scanned signed document to the workflow service 110.

The MFP instructions may further include causing a graphical user interface of the MFP user interface 148 to display a notification. The notification may include a message from the workflow service 110. Other notifications may be displayed.

Within the context of the present disclosure, the workflow service 110 may be configured to perform several functions. For example, the workflow service 110 may be configured to determine an instance of the document and determine the graphical identifier 132 based on the determined instance of the document. The determination of the particular instance of the document may be based on, for example, the most recent revision of the document.

Furthermore, the workflow service 110 may be configured to determine a target mobile computing device. The target mobile computing device may correspond to a mobile computing device associated with a requested signor or approver of the document. The workflow service 110 may be configured to send the request for document approval to the target mobile computing device and receive the authentication query, which may include the graphical identifier 132 or information corresponding to the graphical identifier 132. The workflow service 110 may be further configured to determine an authenticated user based on a correspondence between the authentication information and the target mobile computing device. That is, the workflow service 110 may compare the authentication information to an expected set of data, such as an expected graphical identifier. If an exact, or a statistically probable, match exists, then an authenticated user may be determined.

In response to determining the authenticated user, the workflow service 110 may be configured to send a printable version of the document, which corresponds to the determined instance of the document. Finally, the workflow service 110 may be configured to receive and store the signed document.

The mobile computing device 130 may be further configured to perform several other functions. For example, the mobile computing device 130 may be configured to display, via the display screen, a document preview. The document preview may include information about the document. For example, the information may include at least one of a document name, a signature placeholder, or a revision history corresponding to the document. Additionally, the mobile computing device 130 may be configured to receive an input indicative of a user signature 152. That is, the mobile computing device 130 may receive an input indicative of a signature or another type of approval of the document, e.g. via a touchscreen input. Furthermore, the mobile computing device 130 may be configured to send, to the MFP 140, a signature image based on the input.

The MFP 140 may include further instructions to receive the signature image (e.g. from a scan of the signed document), merge the signature image with the document as a merged document, and store the merged document.

The workflow service 110 may be further configured to determine an instance of the document and determine the graphical identifier based on the determined instance of the document. Furthermore, the workflow service 110 may be configured to send the request for document approval to the mobile computing device 130, receive the authentication query, and determine an authenticated user based on a comparison between the authentication query and the determined instance of the document.

The workflow service 110 may also be configured to, in response to determining the authenticated user, send the acknowledgment to the workflow service client 146 and send information indicative of the document preview to the mobile computing device 130.

Figure 2:
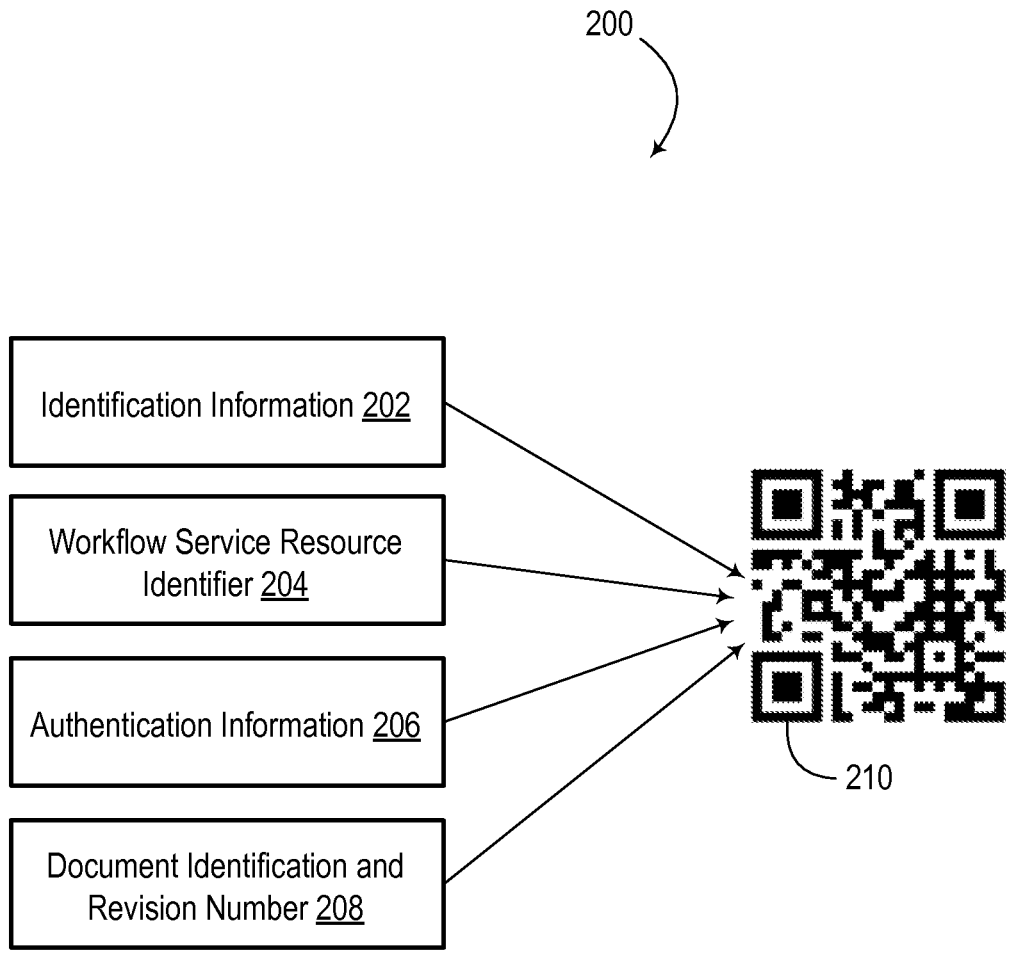
FIG. 2 is a schematic diagram illustrating a graphical identifier, according to an example embodiment.

FIG. 2 is a schematic diagram illustrating a graphical identifier 200, according to an example embodiment. The graphical identifier 200 may correspond with graphical identifier 132 as illustrated and described in relation to FIG. 1. The graphical identifier 200 may include a graphical symbol 210, which, as discussed herein, may include a QR code, a bar code, or another type of one- or two-dimensional graphical shape, writing, marking, or symbol. In some embodiments, the graphical symbol 210 may include encoded identification information 202, a workflow service resource identifier 204, authentication information 206, and/or a document identification and revision number 208. Other information related to the requested document for approval may be encoded in the graphical symbol 210 and the form and type of information should not be limited by the examples provided herein.

Figure 3:
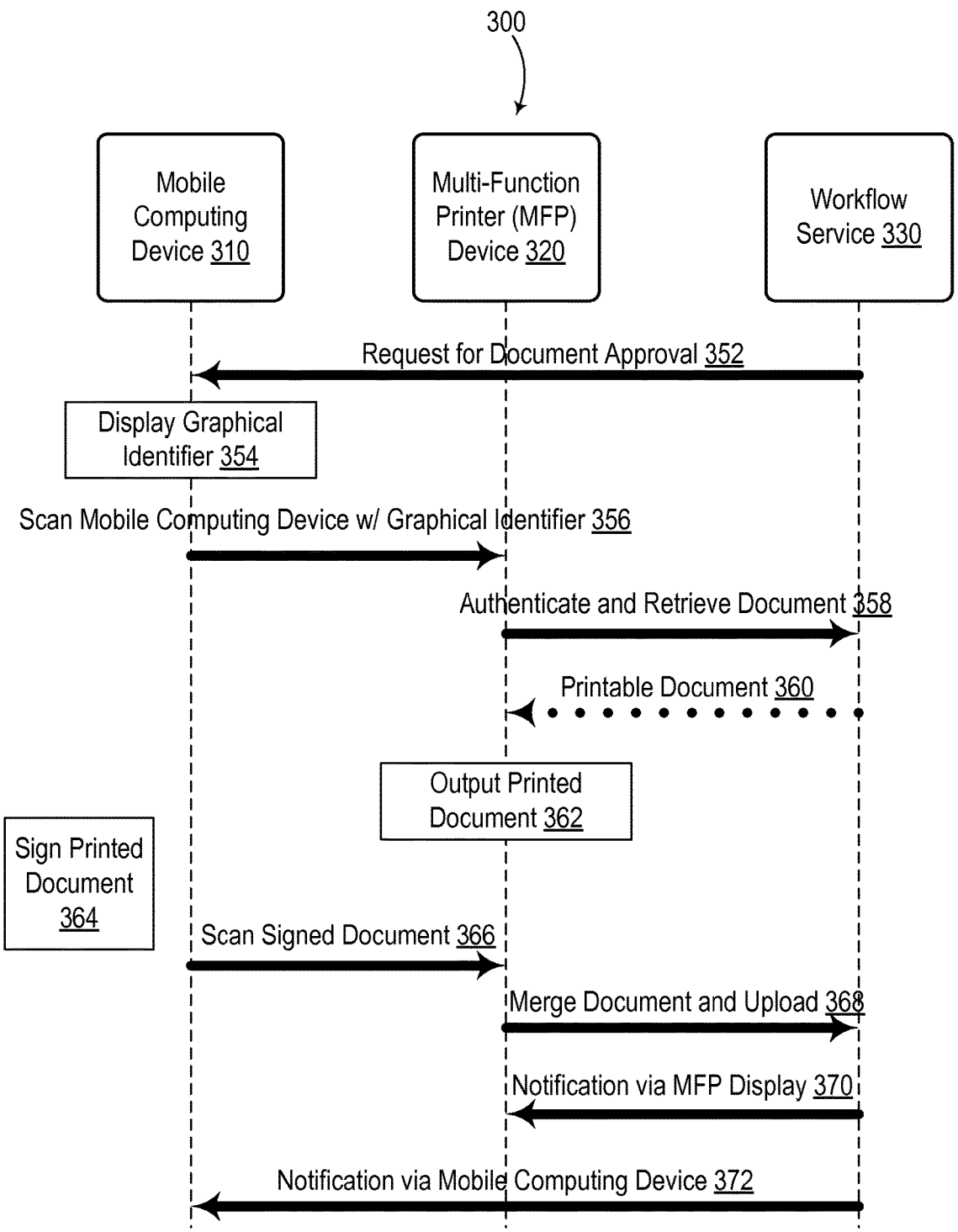
FIG. 3 is a schematic diagram illustrating interactions in a system, according to an example embodiment.

FIG. 3 is a schematic diagram illustrating interactions in a system 300, according to an example embodiment. System 300 may include similar or identical elements as compared to system 100 described and illustrated in reference to FIG. 1. For example, system 300 may include a mobile computing device 310, an MFP 320, and a workflow service 330.

In an example embodiment, interaction 352 may include the workflow service 330 sending a request for document approval to the mobile computing device 310. Interaction 354 may include the mobile computing device 310 displaying a graphical identifier on the display of the mobile computing device 310. Interaction 356 may include scanning, with the MFP 320, the graphical identifier being displayed via the mobile computing device 310. Interaction 358 may include the MFP 320 sending to the workflow service 330 authentication information based on the scanned graphical identifier.

Interaction 360 may include the workflow service 330 providing a printable version of the document to the MFP 320. Interaction 362 may include the MFP 320 printing a physical document for review and/or approval. Interaction 364 may include the document being signed or otherwise approved, e.g. a user may sign the physical document. Interaction 366 may include the signed physical document being scanned at the MFP 320.

In some example embodiments, one or more interactions described in reference to FIG. 3 may be carried out or conducted by one or more further MFPs (not illustrated). That is, one or more interactions need not include the same MFP (MFP 320). For example, in reference to interaction 362, the physical document may be printed by one MFP from a plurality of MFPs. Additionally or alternatively, in reference to interaction 366, the signed physical document may be scanned by a different MFP from the plurality of MFPs.

In yet other example embodiments, one or more interactions described in reference to FIG. 3 may be carried out by a peripheral device other than an MFP. For example, in reference to interaction 362, the physical document may be printed by a peripheral device equipped with a printing function, e.g. a printer. In reference to interaction 366, the signed physical document may be scanned by peripheral device equipped with scanning function, e.g. a scanner. One having skill in the art will understand that a variety of peripheral devices (MFP and/or other types of peripherals) may be used to carry out the interactions described and illustrated in reference to FIG. 3. All such peripheral devices, and combinations of such peripheral devices, are contemplated herein.

Interaction 368 may include the MFP 320 merging the signed document and uploading/sending it to the workflow service 330. Interaction 370 may include providing a notification via a display of the MFP 320. Additionally or alternatively, interaction 372 may include providing a notification via a display of the mobile computing device 310. One or both of the notifications may include a message about the merged document being uploaded to the workflow service 330. Other types of notifications are possible. Furthermore, different content of the notifications is possible.

III. Method Examples

Figure 4:
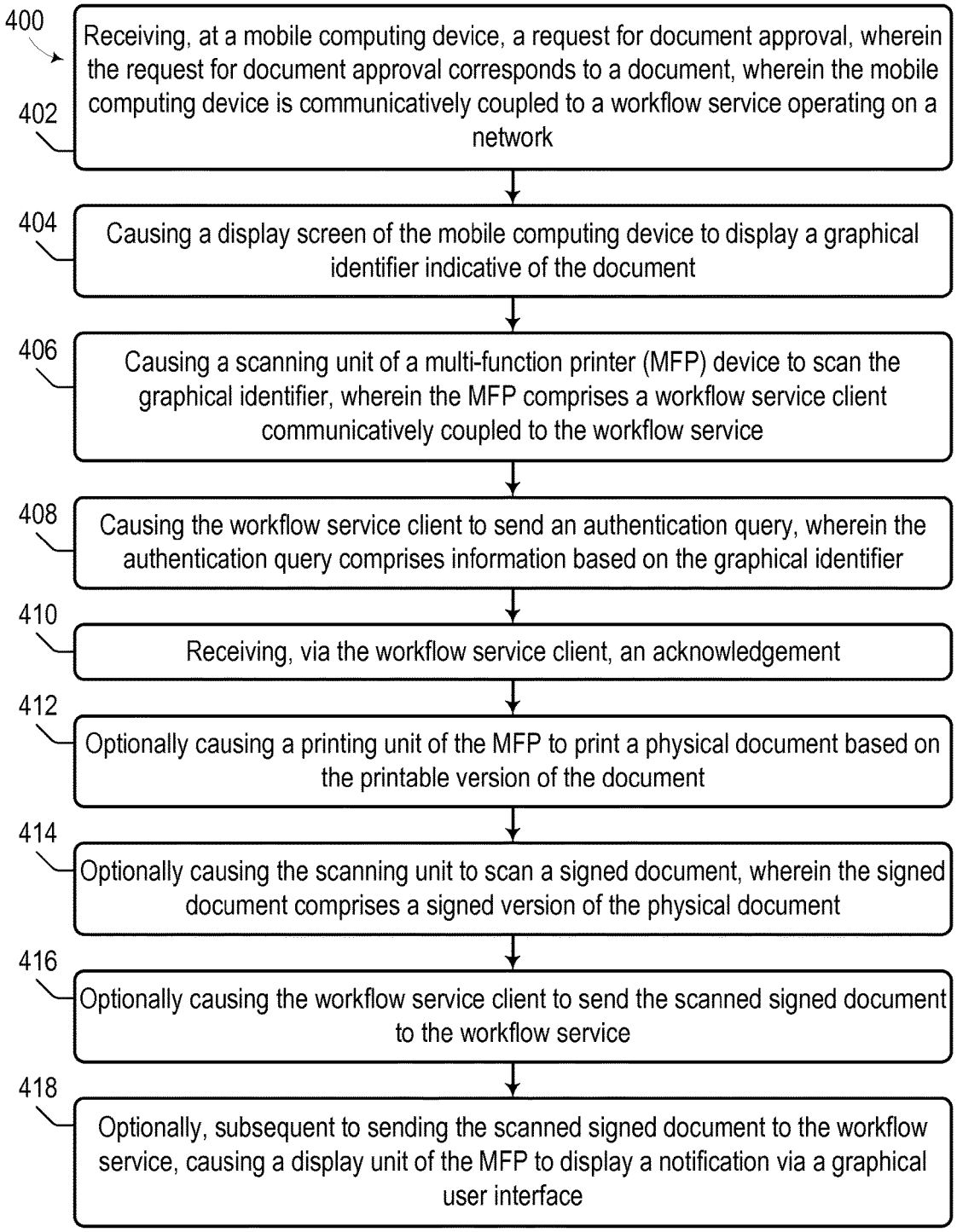
FIG. 4 is a flow diagram illustrating a method, according to an example embodiment.

FIG. 4 is a flow diagram illustrating a method 400, according to an example embodiment. Although FIG. 4 illustrates method 400 as including certain blocks in a particular order, it should be understood that blocks may be added, subtracted, and/or carried out in a different order. Furthermore, some or all of the blocks of method 400 may be carried out by system 100 utilizing a graphical identifier 200 and including interactions as illustrated and described in reference to FIG. 1, FIG. 2, and FIG. 3.

Block 402 may include receiving, at a mobile computing device, a request for document approval. The mobile computing device is communicatively coupled to a workflow service operating on a network. The mobile computing device could include, but should not be limited to, a smartphone, a tablet, a smartwatch, a wearable computing device, a laptop, or another type of portable computing device with a display screen.

The request for document approval corresponds to a document. The request for document approval may take the form of an e-mail, a text message, a code, an image, a video, a webpage, or a universal resource locator (URL). Other forms of the request for document approval are possible. The request for document approval may be received directly or indirectly from the workflow service or it may be received via another service. Alternatively, the request for document approval may be initiated by the mobile computing device.

The workflow service may be a cloud-based combination of distributed computing hardware and software. For example, the workflow service may include a network of computers that may run one or more file server software programs. The workflow service is configured to store, among other various file types, documents and related revisions of those documents. The workflow service is also configured to provide direct or indirect access to these documents, via graphical user interface, file download, and/or file sharing, to the mobile computing device and/or a multi-function printer (MFP) device.

In some embodiments, the workflow service may determine a target mobile computing device. The target mobile computing device may be determined based on, for example, a mobile computing device being associated with a particular user, location, and/or proximity to an MFP, etc. In such a scenario, the workflow service may send the request for document approval to the target mobile computing device, e.g. via e-mail, text message, or another type of communication and/or messaging.

Block 404 may include causing a display screen of the mobile computing device to display a graphical identifier indicative of the document. The graphical identifier may be determined based on at least the document and, optionally, based on a specific revision of the document. Additionally, the graphical identifier may be determined based on the specific mobile computing device, which may optionally be further associated with a specific user of that mobile computing device. In other words, each request for document approval may include a unique graphical identifier that may be based on a specific revision or version of the document and further on the mobile computing device and, optionally, the user of that mobile computing device. In some embodiments, the graphical identifier may include a two-dimensional graphical identifier, a one-dimensional barcode, a matrix barcode, or a machine-readable optical label. Other forms of the graphical identifier are possible.

Displaying the graphical identifier on the mobile computing device may be a result of a specific condition or status of the mobile computing device occurring. For example, the mobile computing device may be directed to navigate to a URL link delivered via email. Responsive to navigating to the URL link, the graphical identifier may be displayed, for example as an image file at the URL link. Alternatively, the graphical identifier may be displayed upon opening a file attached to the email. As a further alternative, the graphical identifier may be displayed by viewing a text message or another type of instant message.

In an example embodiment, the workflow service determines an instance of the document. The instance of the document may be based on the most recent revision of the document, or, alternatively, may be based on a specific request to approve a particular instance of the document. The workflow service may determine the graphical identifier based on the determined instance of the document. The workflow service may also determine the graphical identifier based on other criteria, such as information about a particular user, a location of a particular MFP, a particular mobile computing device, etc.

In some embodiments, the mobile computing device may determine, and display, the graphical identifier itself based on the document approval request. That is, the mobile computing device may receive information about a particular document and, optionally, a particular revision of the document. Based on the received information, the mobile computing device may determine, and subsequently display, the graphical identifier. Other ways of causing the graphical identifier to be displayed on the mobile computing device are contemplated herein.

Block 406 may include causing a scanning unit of the MFP to scan the graphical identifier. The MFP may be a device that incorporates the functionality of, for example, a printing device and a scanning device, while providing network-connectivity. The MFP may include a workflow service client communicatively coupled to the workflow service. In some embodiments, the workflow service client may include software and/or hardware configured to communicatively interact with the workflow service and the mobile computing device as described in reference to interactions 300 as illustrated and described in reference to FIG. 3.

Block 408 may include causing the workflow service client to send an authentication query. In some embodiments, the authentication query may be received at the workflow service. However, the authentication query may be received by other services/devices. The authentication query may include information based on the graphical identifier. Alternatively or additionally, the authentication query may include one of metadata, a filename, a timestamp, a version number, or an identifier associated with the document. Additionally, the authentication query may include authentication information indicative of the mobile computing device. For example, the authentication query may be a message to the workflow service that provides information about the mobile computing device (mobile computing device identifier, MFP location, etc.) In some embodiments, the authentication query may be a scanned image of the graphical identifier itself. In other embodiments, the MFP may determine the authentication information from a scanned image of the graphical identifier and provide the authentication information in a different format (e.g. a non-image format). Other ways to provide authentication information to the workflow service are possible.

In response to receiving the authentication information at the workflow service, the workflow service may determine an authenticated user. The determination of an authenticated user may be based on, for instance, a correspondence between the authentication information and the target mobile computing device. In other words, the received authentication information may include information about: the document, the mobile computing device that was scanned, the MFP from which the authentication information was sent, a physical signature, etc. Any one or more of these data may be compared with expected values determined by the workflow service. A direct correspondence or match between the authentication information and the expected values, or at least a statistical likelihood of a match above a predetermined threshold, may provide a basis for the workflow service to determine an authenticated user. Other ways to determine an authenticated user are possible.

Block 410 may include receiving, via the workflow service client, an acknowledgement. The acknowledgement may include, for example, a message indicating that authentication was successful. Furthermore, the acknowledgement may include a printable version of the document.

Block 412 may optionally include causing a printing unit of the MFP to print a physical document based on the printable version of the document. In an example embodiment, the acknowledgement may be sent from the workflow service in response to determining the authenticated user.

Block 414 may also optionally include causing the scanning unit to scan a signed document. The signed document may include a version of the physical document with a physical signature, e.g. signed by a user of the mobile computing device. Alternatively, the signed document may include an electronic signature or another type of mark, symbol, or code indicative of an authorization or approval of the document.

Block 416 may optionally include causing the workflow service client to send the scanned signed document to the workflow service. That is, the MFP and its workflow service client may transmit the signed document to the workflow service. Thereafter, the workflow service may store the signed document.

Block 418 may optionally include, subsequent to sending the scanned signed document to the workflow service, causing a display unit of the MFP to display a notification via a graphical user interface. The notification may include a message indicative of the authentication. Additionally or alternatively, the notification may include a preview of the document.

Namely, the method may optionally include causing the display screen of the mobile computing device to display a document preview. The document preview may include information about the document. In this context, the information about the document could include, for example, at least one of a document name, at least a portion of the content of the document, a signature placeholder, or a revision history corresponding to the document.

The method may optionally include receiving, at the mobile computing device, input indicative of a signature.

For example, in response to viewing the document preview, some other action may be performed with respect to a document, e.g. approval or authorization. In such a scenario, the mobile computing device may be configured to receive an input via a touch pad, a touch screen, and/or a graphical user interface corresponding to the approval or authorization.

In the case where the mobile computing device receives a signature via the touch screen, the method may optionally include causing the mobile computing device to send, to the workflow service, a signature image based on the input. The signature image may be a graphical representation of the signature from the mobile computing device.

In some embodiments, the MFP may merge the signature image with the document as a merged document. That is, the MFP may combine the signature image from the mobile computing device with the document to create a merged document that incorporates the user signature. Furthermore, the MFP may upload the merged document to the workflow service. Thereafter, the workflow service may store the merged document.

In some example embodiments, one or more blocks described in reference to method 400 and FIG. 4 may be carried out or conducted by one or more different MFPs. That is, the blocks of method 400 need not include the same MFP, e.g. MFP 320. For example, in reference to block 412, the physical document may be printed by an MFP from a plurality of MFPs, which may be distinct from the MFP that scanned the graphical identifier in block 406. Additionally or alternatively, in reference to block 414, the signed physical document may be scanned at another MFP from the plurality of MFPs.

While various examples and embodiments have been disclosed, other examples and embodiments will be apparent to those skilled in the art. The various disclosed examples and embodiments are for purposes of illustration and are not intended to be limiting, with the true scope and spirit being indicated by the following claims.

What is claimed is:

1. A method comprising:
   receiving, at a mobile computing device, from a workflow service operating on a network, a request for document approval, wherein the request for document approval corresponds to a document to be signed by a user of the mobile computing device;
   causing a display screen of the mobile computing device to display a graphical identifier indicative of the document;
   causing a scanning unit of a multi-function printer (MFP) device to scan the graphical identifier, wherein the MFP comprises a workflow service client communicatively coupled to the workflow service;
   causing the workflow service client to send an authentication to the workflow service, wherein the authentication query comprises information based on the graphical identifier and authentication information indicative of the mobile computing device; and
   receiving, via the workflow service client, an acknowledgement from the workflow service.

2. The method of claim 1 wherein the acknowledgement comprises a printable version of the document, and the method further comprising:
   causing a printing unit of the MFP to print a physical document for signature by the user of the mobile computing device, based on the printable version of the document;
   causing the scanning unit to scan a signed document, wherein the signed document comprises a signed version of the physical document that has been signed by the user of the mobile computing device;
   causing the workflow service client to send the scanned signed document to the workflow service; and
   subsequent to sending the scanned signed document to the workflow service, causing a display unit of the MFP to display a notification via a graphical user interface.

3. The method of claim 1, further comprising:
   causing the display screen of the mobile computing device to display a document preview, wherein the document preview comprises at least one of a document name, a signature placeholder, or a revision history corresponding to the document;
   receiving, at the mobile computing device, input indicative of a user signature from the user of the mobile computing device;
   causing the mobile computing device to send, to the workflow service, a signature image based on the input; and
   causing the MFP to merge the signature image with the document as a merged document.

4. The method of claim 3, further comprising:
   causing the workflow service to determine an instance of the document;
   causing the workflow service to determine the graphical identifier based on the determined instance of the document;
   causing the workflow service to determine a target mobile computing device;
   causing the workflow service to send the request for document approval to the target mobile computing device;
   receiving the authentication query at the workflow service;
   causing the workflow service to determine an authenticated user based on a correspondence between the authentication information and the target mobile computing device;
   in response to the workflow service determining the authenticated user, sending the acknowledgment to the workflow service client and sending information indicative of the document preview to the mobile computing device; and
   storing the merged document.

5. The method of claim 4, wherein the instance of the document is based on at least one of the most recent revision of the document and a specific request to approve a particular instance of the document.

6. The method of claim 1 wherein the acknowledgement comprises a printable version of the document, and the method further comprising:
   causing a printing unit of at least one MFP of a plurality of MFPs to print a physical document based on the printable version of the document;
   causing a scanning unit of at least one MFP of the plurality of MFPs to scan a signed document, wherein the signed document comprises a signed version of the physical document that has been signed by the user of the mobile computing device;
   causing the workflow service client to send the scanned signed document to the workflow service;
   subsequent to sending the scanned signed document to the workflow service, causing a display unit of at least one MFP of the plurality of MFPs to display a notification via a graphical user interface; and causing at least one MFP of the plurality of MFPs to merge the signature image with the document as a merged document.

7. The method of claim 1 wherein the graphical identifier comprises at least one of: a quick response (QR) code, a two-dimensional graphical identifier, a one-dimensional barcode, a matrix barcode, or a machine-readable optical label.

8. A system comprising:
a workflow service operating on a network;
a mobile computing device, wherein the mobile computing device comprises a display screen, wherein the mobile computing device is communicatively coupled to the workflow service, and wherein the mobile computing device is configured to:
receive from the workflow service a request for document approval, wherein the request for document approval corresponds to a document to be signed by a user of the mobile computing device; and
display a graphical identifier indicative of the document; and
a multi-function printer (MFP) device, wherein the MFP comprises:
a scanning unit;
a printing unit;
a display unit, wherein the display unit is configured to display a graphical user interface;
a workflow service client communicatively coupled to the workflow service; and
a processor configured to execute instructions, wherein the instructions comprise:
causing the scanning unit to scan the graphical identifier displayed on the display screen of the mobile computing device;
causing the workflow service client to send an authentication query to the workflow service, wherein the authentication query comprises information based on the graphical identifier and authentication information indicative of the mobile computing device; and
receiving, via the workflow service client, an acknowledgment.

9. The system of claim 8, wherein the acknowledgment comprises a printable version of the document and wherein the instructions further comprise:
causing the printing unit to print a physical document based on the printable version of the document for signature by the user of the mobile computing device;
causing the scanning unit to scan a signed document, wherein the signed document comprises a signed version of the physical document that has been signed by the user of the mobile computing device;
causing the workflow service client to send the scanned signed document to the workflow service; and
causing the display unit to display a notification via the graphical user interface.

10. The system of claim 9 wherein the workflow service is configured to:
determine an instance of the document;
determine the graphical identifier based on the determined instance of the document;
determine a target mobile computing device;
send the request for document approval to the target mobile computing device;
receive the authentication query;
determine an authenticated user based on a correspondence between the authentication information and the target mobile computing device;
in response to determining the authenticated user, send the printable version of the document, wherein the printable version of the document corresponds to the determined instance of the document;
receive the signed document; and
store the signed document.

11. The system of claim 8, wherein the mobile computing device is further configured to:
display, via the display screen, a document preview, wherein the document preview comprises at least one of a document name, a signature placeholder, or a revision history corresponding to the document;
receive an input indicative of a user signature; and
send, to the MFP, a signature image based on the input.

12. The system of claim 11, wherein the MFP is further configured to:
receive the signature image;
merge the signature image with the document as a merged document; and
store the merged document.

13. The system of claim 11 further comprising a plurality of MFPs, wherein at least one MFP of the plurality of MFPs is further configured to:
receive the signature image;
merge the signature image with the document as a merged document; and
store the merged document.

14. The system of claim 8, wherein the workflow service is configured to:
determine an instance of the document;
determine the graphical identifier based on the determined instance of the document;
send the request for document approval to the mobile computing device;
receive the authentication query at the workflow service;
determine an authenticated user based on a comparison between the authentication query and the determined instance of the document; and
in response to determining the authenticated user, send the acknowledgment to the workflow service client and send information indicative of the document preview to the mobile computing device.

15. The system of claim 8 wherein the request for document approval comprises the graphical identifier.

16. The system of claim 8 wherein the graphical identifier comprises at least one of: a quick-reference (QR) code, a two-dimensional graphical identifier, a one-dimensional barcode, a matrix barcode, or a machine-readable optical label, and wherein the request for document approval comprises at least one of an e-mail, a text message, a code, an image, a video, a webpage, or a universal resource locator (URL).

17. The system of claim 8 wherein the authentication query further comprises information corresponding to the document, wherein the information corresponding to the document comprises at least one of metadata, a filename, a timestamp, a version number, or an identifier associated with the document.

18. A method comprising:
causing a scanning unit of a multi-function printer (MFP) device to scan a graphical identifier displayed on a mobile computing device associated with a user, the graphical identifier indicative of a document to be signed by the user, wherein the MFP comprises a workflow service client communicatively coupled to a workflow service;
authenticating the user by transmitting an authentication query comprises to the workflow service, wherein the authentication query includes information pertaining to the graphical identifier and the mobile computing device;

receiving a printable version of the document indicated by the graphical identifier, wherein the document includes a signature placeholder for receiving a signature from the user;

providing the printable version of the document to the user of the mobile computing device; and receiving a signed version of the document, wherein the signed version includes the signature of the user.

19. The method of claim 18, wherein the graphical identifier is provided by the workflow service to the mobile computing device as part of a request for document approval.

20. The method of claim 18, wherein providing the printable version of the document to the user of the mobile computing device comprises printing the printable version of the document for signature by the user, wherein receiving the signed version of the document includes scanning the signed version of the document.

21. The method of claim 18, wherein providing the printable version of the document to the user of the mobile computing device comprises sending information to the mobile computing device to cause a document preview to be displayed on the mobile computing device, wherein receiving the signed version of the document includes receiving, from the mobile computing device, an input indicative of a user signature.

22. The method of claim 21, wherein the input is a signature image.

* * * * *